(12) United States Patent
Pinto Coelho et al.

(10) Patent No.: US 7,595,014 B2
(45) Date of Patent: Sep. 29, 2009

(54) ACQUISITION PROCESS OF STOPPERS FROM MIXED MATERIAL AGGLOMERATE

(76) Inventors: José Norberto Pinto Coelho, Rua José Piovesan Filho 99 Caxambú, São Paulo (BR) 13218-630; Thiago José Pelin Coelho, Rua José Piovesan Filho 99 Caxambú, São Paulo (BR) 13218-630; Flávia De Maio Coelho, Rua José Piovesan Filho 99 Caxambú, São Paulo (BR) 13218-630

( * ) Notice: Subject to any disclaimer, the term of this patent is extended or adjusted under 35 U.S.C. 154(b) by 202 days.

(21) Appl. No.: 11/866,823

(22) Filed: Oct. 3, 2007

(65) Prior Publication Data

US 2008/0079189 A1  Apr. 3, 2008

(30) Foreign Application Priority Data

Oct. 3, 2006  (BR) .................................... 0604459

(51) Int. Cl.
*B65D 39/00*  (2006.01)
*B29C 47/00*  (2006.01)

(52) U.S. Cl. ........................ 264/109; 264/118; 264/119; 264/120; 215/364

(58) Field of Classification Search ........................ None
See application file for complete search history.

(56) References Cited

U.S. PATENT DOCUMENTS

| | | | | |
|---|---|---|---|---|
| 4,042,543 | A | * | 8/1977 | Strickman et al. ............. 524/16 |
| 4,188,457 | A | * | 2/1980 | Throp ........................ 215/261 |
| 4,624,880 | A | * | 11/1986 | Goulding et al. ............ 428/143 |
| 5,317,047 | A | * | 5/1994 | Sabate et al. .................. 524/16 |

* cited by examiner

*Primary Examiner*—Mary Lynn F Theisen
(74) *Attorney, Agent, or Firm*—Hamilton, DeSanctic & Cha, LLP

(57) ABSTRACT

Processes for manufacturing stoppers from mixed material agglomerate are provided. According to one embodiment, a homogenized mass is produced by processing a mixture in which cork power, having particle sizes approximately within a range of 30 to 300 mesh, predominates with agglomerating equipment, the mixture also including rubber or resin, a cross-linking agent and an expander. Rollers are then produced according to a predefined measurement of desired stoppers by passing the homogenized mass through a cylindrical extruder. The rollers are then finished and expanded and reticulated in a press machine. Finally, the rollers are polished and severed to form appropriate dimensional shapes. In one embodiment, the agglomerated and homogenized mass can also be shaped in expanded and cross-linked plates, from which, through drills, molds, and/or other suitable tool equipment, the corks are obtained in the desired measures.

13 Claims, No Drawings

ACQUISITION PROCESS OF STOPPERS FROM MIXED MATERIAL AGGLOMERATE

This application claims the benefit of Brazilian Invention Patent Application Serial No. PI0604459-0, filed Oct. 3, 2006, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006-2007.

BACKGROUND

1. Field

Embodiments of the present invention generally relate to fabrication of stoppers, such as those, for example, that may be used to seal a wine bottle, and in particular to (i) processes of using residue from cork transformation in connection with fabrication of stoppers by mixing cork powder with ethylene-vinyl acetate (EVA) and/or rubber and/or resin, an expander and a cross-linking agent; and (ii) products resulting from such fabrication processes.

2. Description of the Related Art

As is commonly known and mainly by those used to the technique, cork is a rugous bark extracted from the popularly tree known as "Cork Tree," made up of small air-containing cells and covered by layers of cellulous tissue, wax and suberins, revealing itself as a light material that does not decompose due to liquids or gases. Cork is resistant to fire and is thermally and acoustically insulated, along with a series of other proprieties that make it useful in the context of many different applications.

At present, residue from cork transformation, e.g., cork powder resulting from polishing of cork stoppers with sandpaper, are often burned, discarded or otherwise randomly disposed in the environment contributing to environmental disorder.

SUMMARY

Processes for manufacturing stoppers from mixed material agglomerate and the resulting products are described. According to one embodiment, a homogenized mass is produced by processing a mixture in which cork power, having particle sizes approximately within a range of 30 to 300 mesh, predominates with agglomerating equipment, the mixture also including rubber or resin, a cross-linking agent and an expander. Rollers are then produced according to a predefined measurement of desired stoppers by passing the homogenized mass through a cylindrical extruder. The rollers are then finished and expanded and reticulated in a press machine. Finally, the rollers are polished and severed to form appropriate dimensional shapes. In one embodiment, the agglomerated and homogenized mass can also be shaped in expanded and cross-linked plates, from which, through drills, molds, and/or other suitable tool equipment, the corks are obtained in the desired measures.

Other features of embodiments of the present invention will be apparent from the accompanying drawings and from the detailed description that follows.

DETAILED DESCRIPTION

Processes and resulting products are described for manufacturing stoppers from mixed material agglomerate.

In the following description, numerous specific details are set forth in order to provide a thorough understanding of embodiments of the present invention. It will be apparent, however, to one skilled in the art that embodiments of the present invention may be practiced without some of these specific details.

Embodiments of the present invention include various steps, which will be described below. The steps may be performed by automated and/or manual means.

While for sake of illustration, embodiments of the present invention are described in the context of stoppers for sealing wine bottles, the methods described herein are equally applicable to stoppers for other uses.

Terminology

Brief definitions of terms used throughout this application are given below.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

Embodiments of the present invention relate to a process of stopper acquisition from an agglomeration and combination of mixed materials (cork powder with EVA, and/or rubber in general, and/or polyolefin resin, and/or thermoplastic resin; and/or other types of resins in general, expander and crosslinker), as well the resulting product obtained thereof, meant to be used on bottle sealing and similar products, to which an innovating and original constructive disposition was given, totally setting itself apart from other similar products on the market, including the usually employed fabrication processes.

Embodiments of the present invention provide an especially elaborated stopper acquisition process, developed towards obtaining a huge practicability, bringing great advantages in fabrication and use, notably in regards to a better use of residues from cork transformation, which will not have to be burned or discarded anymore or randomly disposed in the environment, solving, as well, the well known and increasing controversial problems of environment order.

The use of the mixed material in acquiring hybrid stoppers in accordance with various embodiments of the present invention also involve greater savings and awareness in the use of cork, favoring ecology and nature, not to mention the increase of the already known resilient properties of this raw material. In one embodiment, once residues from cork transformation, such as cork powder, has been aggregated with thermoplastic materials, it will result in a final solid, impermeable, flexible, elastic product of great resistance and perfect dimensional stability.

In view of the development and technological advances that have been taking place over recent decades, especially in sciences and in the use of new materials, along with the concern about the optimization of fabrication processes, processes in accordance with various embodiments of the present invention were developed.

According to one embodiment, the main stages and basic procedures adopted to produce the resulting final product are described as follows:

Firstly, it is processed into an agglomerating device, a mixture called "mass", where the cork powder predominates, resulting from the cork Powder agglomeration and combination with EVA rubber, and/or rubbers in general, and/or polyolefin resins, and/or thermoplastic resins; and/or other types of resins in general, expander and crosslinker.

The above-mentioned homogenized "mass" then passes through a cylindrical extruder, in order to potentialize the mixture even more, thus producing small rollers according to the measurement of the stoppers that it is intended to be made.

The rollers are finished (expanded and crosslinked) in a press machine, where they are horizontally or vertically compressed.

The expanded and crosslinked rollers may then be polished, resulting in a final, velvety finishing. The polished rollers may then be severed into any dimensional forms, forming stoppers that besides their perfect dimensional stabilization are ideal for the purpose that they are made for.

Said agglomerated and homogenized mass can also be shaped in expanded and crosslinked plates, from which, through drills, molds, and/or suitable tool equipment, the corks are obtained in the desired measurements.

Moreover, various of the process described herein also include the advantage of a better use of the cork in industrial residues, originated from the finishing of the stoppers, which are always polished with sandpaper; which cork powder with densities or particle sizes ranging from approximately 30 to 300 mesh, cannot be used in the traditional fabrication process and are usually sent for burning.

Thus, it is understandable that the process and its respective resulting product show itself to be extremely simple in its formulation, presenting easy feasibility and offering excellent results both of a practical and functional order over the conventional existing ones, therefore fully deserving the protection claimed below.

While various embodiments of the present invention have been described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of manufacturing stoppers comprising:
    producing a homogenized mass by processing a mixture in which cork powder, having particle sizes approximately within a range of 30 to 300 mesh, predominates with agglomerating equipment, the mixture also including rubber or resin, a cross-linking agent and an expander;
    producing rollers according to a predefined measurement of desired stoppers by passing the homogenized mass through a cylindrical extruder;
    finishing and expanding the rollers;
    reticulating the rollers in a press machine;
    polishing the rollers; and
    forming appropriate dimensional shapes by severing the rollers.

2. The method of claim 1, wherein the cork powder comprises cork industry residue.

3. The method of claim 1, wherein the rubber comprises ethylene-vinyl acetate (EVA) rubber.

4. The method of claim 1, wherein the resin comprises polyolefin resin.

5. The method of claim 1, wherein the resin comprises thermoplastic resin.

6. The method of claim 1, wherein the press machine presses the rollers horizontally.

7. The method of claim 1, wherein the press machine presses the rollers vertically.

8. A method of manufacturing stoppers comprising:
    producing a homogenized mass by processing a mixture in which cork powder, having particle sizes approximately within a range of 30 to 300 mesh, predominates with agglomerating equipment, the mixture also including rubber or resin, a cross-linking agent and an expander; and
    producing stoppers according to a predefined measurement of desired stoppers by shaping the homogenized mass in expanded and crosslinked plates and drilling or molding the shaped homogenized mass to form the stoppers.

9. The method of claim 8, wherein the cork powder comprises cork industry residue.

10. The method of claim 8, wherein the rubber comprises ethylene-vinyl acetate (EVA) rubber.

11. The method of claim 8, wherein the resin comprises polyolefin resin.

12. The method of claim 8, wherein the resin comprises thermoplastic resin.

13. A method of acquiring stoppers from mixed material agglomerate, the method comprising: in an agglomerating equipment is processed a mixture called "mass," where the cork powder predominates, resulting from the agglomeration and mixture of the cork powder with E.V.A., and/or rubbers in general, and/or polyolefin resins, and/or thermoplastic resins, and/or other types of resins in general, crosslinker and expander; and that such a homogenized "mass" later passes through a cylindrical extruder in order to potentialize the mixture even more, producing rollers according to the measurement of the stopper that it is intended to be made, which are finished, expanded and reticulated in a press machine; where they may be pressed either horizontally or vertically, so, that already reticulated rollers are obtained. Then they are polished, acquiring a final, velvety finishing, and later they are severed into any dimensional shapes, conforming rollers which besides their perfect dimensional stabilization are ideal for the purpose that they are made for, being the case that said agglomerated and homogenized mass can also be shaped in expanded and crosslinked plates, from which, through drills, molds, and/or suitable tool equipment, the corks are obtained in the desired measures, highlighting that the present process includes the use of residues of the cork industry originated from the finishing given to stoppers, which are always polished with sandpaper, which cork powder with a thickness between 30 to 300 mesh, can not be used in traditional fabrication processes and are sent for burning.

* * * * *